(12) United States Patent
Hao et al.

(10) Patent No.: US 7,827,499 B2
(45) Date of Patent: Nov. 2, 2010

(54) HIERARCHICAL DATASET DASHBOARD VIEW

(75) Inventors: Ming C. Hao, Palo Alto, CA (US);
Umeshwar Dayal, Saratoga, CA (US);
Daniel A. Keim, Steisslingeu (DE);
Joem Schneidewind, Constance (DE);
Robert Lovejoy Raymond, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1663 days.

(21) Appl. No.: 10/977,463

(22) Filed: Oct. 29, 2004

(65) Prior Publication Data

US 2006/0095858 A1    May 4, 2006

(51) Int. Cl.
*G06F 3/048* (2006.01)
(52) U.S. Cl. .................................. 715/764; 715/713
(58) Field of Classification Search .................. 715/764, 715/713, 771, 772, 853; 702/19
See application file for complete search history.

(56) References Cited

U.S. PATENT DOCUMENTS

| | | | |
|---|---|---|---|
| 3,487,308 A | 12/1969 | Johnson | |
| 5,581,797 A | 12/1996 | Baker et al. | |
| 5,588,117 A | 12/1996 | Karp et al. | |
| 5,608,904 A | 3/1997 | Chaudhuri et al. | |
| 5,623,590 A * | 4/1997 | Becker et al. | 715/772 |
| 5,623,598 A | 4/1997 | Voigt et al. | |
| 5,634,133 A | 5/1997 | Kelley | |
| 5,659,768 A * | 8/1997 | Forbes et al. | 715/201 |
| 5,694,591 A | 12/1997 | Du et al. | |
| 5,742,778 A | 4/1998 | Hao et al. | |
| 5,757,356 A | 5/1998 | Takasaki et al. | |
| 5,801,688 A | 9/1998 | Mead et al. | |
| 5,828,866 A | 10/1998 | Hao et al. | |
| 5,844,553 A | 12/1998 | Hao et al. | |
| 5,878,206 A | 3/1999 | Chen et al. | |
| 5,903,891 A | 5/1999 | Chen et al. | |
| 5,924,103 A | 7/1999 | Ahmed et al. | |
| 5,929,863 A | 7/1999 | Tabei et al. | |
| 5,940,839 A | 8/1999 | Chen et al. | |
| 5,986,673 A | 11/1999 | Martz | |
| 5,999,193 A | 12/1999 | Conley, Jr. et al. | |
| 6,052,890 A | 4/2000 | Malagrino, Jr. et al. | |
| 6,115,027 A | 9/2000 | Hao et al. | |
| 6,144,379 A | 11/2000 | Bertram et al. | |
| 6,211,880 B1 | 4/2001 | Impink, Jr. | |
| 6,211,887 B1 | 4/2001 | Meier et al. | |

(Continued)

FOREIGN PATENT DOCUMENTS

EP    0778001    11/1996

OTHER PUBLICATIONS

Deun et al., Multidimensional Scaling, Open and Distance Learning, Jan. 12, 2000 (pp. 1-16).

(Continued)

*Primary Examiner*—Kieu Vu
*Assistant Examiner*—Omar Abdul-Ali

(57) ABSTRACT

Receiving a hierarchical dataset including child data items that depend directly or indirectly from one or more parent data items. Processing the hierarchical dataset to generate nodes for each data item within the hierarchical dataset, wherein nodes for child data items are generated within nodes for parent data items and aligning nodes representing like data items in a dashboard view.

27 Claims, 6 Drawing Sheets

U.S. PATENT DOCUMENTS

| | | | |
|---|---|---|---|
| 6,269,325 B1 | 7/2001 | Lee et al. | |
| 6,314,453 B1 | 11/2001 | Hao et al. | |
| 6,377,287 B1 | 4/2002 | Hao et al. | |
| 6,400,366 B1 | 6/2002 | Davies et al. | |
| 6,429,868 B1 | 8/2002 | Dehner, Jr. et al. | |
| 6,462,762 B1 * | 10/2002 | Ku et al. | 715/853 |
| 6,466,946 B1 | 10/2002 | Mishra et al. | |
| 6,502,091 B1 | 12/2002 | Chundi et al. | |
| 6,584,433 B1 | 6/2003 | Zhang et al. | |
| 6,590,577 B1 | 7/2003 | Yonts | |
| 6,603,477 B1 | 8/2003 | Tittle | |
| 6,658,358 B2 | 12/2003 | Hao et al. | |
| 6,684,206 B2 | 1/2004 | Chen et al. | |
| 6,700,590 B1 * | 3/2004 | DeMesa et al. | 715/744 |
| 6,701,342 B1 * | 3/2004 | Bartz et al. | 709/200 |
| 6,727,926 B1 * | 4/2004 | Utsuki et al. | 715/853 |
| 6,738,933 B2 * | 5/2004 | Fraenkel et al. | 714/47 |
| 6,934,578 B2 | 8/2005 | Ramseth | |
| 7,020,869 B2 | 3/2006 | Abari et al. | |
| 7,188,169 B2 * | 3/2007 | Buus et al. | 709/224 |
| 7,202,868 B2 | 4/2007 | Hao | |
| 7,221,474 B2 | 5/2007 | Hao et al. | |
| 7,313,533 B2 | 12/2007 | Chang et al. | |
| 7,567,250 B2 | 7/2009 | Hao et al. | |
| 2002/0118193 A1 | 8/2002 | Halstead, Jr. | |
| 2003/0065546 A1 | 4/2003 | Goruer et al. | |
| 2003/0071815 A1 | 4/2003 | Hao et al. | |
| 2003/0221005 A1 | 11/2003 | Betge-Brezetz et al. | |
| 2004/0051721 A1 | 3/2004 | Ramseth | |
| 2004/0054294 A1 | 3/2004 | Ramseth | |
| 2004/0054295 A1 | 3/2004 | Ramseth | |
| 2004/0210540 A1 | 10/2004 | Israel et al. | |
| 2005/0066026 A1 | 3/2005 | Chen et al. | |
| 2005/0119932 A1 | 6/2005 | Hao | |
| 2005/0219262 A1 | 10/2005 | Hao et al. | |
| 2006/0288284 A1 | 12/2006 | Peters et al. | |
| 2007/0225986 A1 | 9/2007 | Bowe, Jr. et al. | |
| 2009/0033664 A1 | 2/2009 | Hao et al. | |

OTHER PUBLICATIONS http://www.pavis.org/essay/multidimensional_scaling.html, 2001 Wojciech Basalaj, (pp. 1-30).

D. Keim et al Pixel Bar Charts: A New Technique for Visualization Large Multi-Attribute Data Sets with Aggregation:, HP Technical Report, Apr. 2001, pp. 1-10.

M. Ankerst et al "Towards an effective cooperation of the computer and the computer user for classification, Proc. 6th Int. Conf. on Knowledge Discovery and Data Mining," (KDD'2000), Aug. 20-23, 2000, Boston, MA, 2000, pp. 1-10.

M.C. Hao et al "Visual Mining of E-customer Behavior Using Pixel Bar Charts,", HP Technical Report, Jun. 20, 2001, pp. 1-7.

B. Shneiderman, "Tree Visualization with Treemaps: a 2-D Space-Filling Approach", pp. 1-10, Jun. 1991.

D. Keim et al "Hierarchical Pixel Bar Charts", IEEE Transactions on Visualization and Computer Graphics, vol. 8, No. 3, Jul.-Sep. 2002, pp. 255-269.

Daniel Keim et al "Designing Pixel-Orientated Visualization Techniques: Theory and Applications" IEEE Transactions on Visualization and Computer Graphics, vol. 6, No. 1, Jan.-Mar. 2000, pp. 59-78.

U.S. Appl. No. 11/076,700 entitled "A Method and System for Creating Visualizations" filed Mar. 10, 2005, pp. 1-31.

U.S. Appl. No. 11/523,240 entitled "Time Relevance-Based Visualization of Data" filed Sep. 19, 2006, pp. 1-22.

Johnson, B , et al., "Tree-maps: a space-filling approach to the visualization of hierarchical information structures", *IEEE Conference on Visualization, 1991. Visualization '91, Proceedings*, (Oct. 22-25, 1991),284-291.

* cited by examiner

FIG. 5

HIERARCHICAL DATASET DASHBOARD VIEW

BACKGROUND

The rapid growth of data collection over recent years has led to the availability of a large number of information technology (IT) services. Transforming collected raw data into valuable information is an important task. However, due to the vast amounts of data, analysts have difficulties in finding relationships within the data.

Visualization tools are used to understand collected data and correlations therein. Such visualization tools commonly use scatter plot diagrams to visualize operational data. Other tools use Slice and Dice Tree Map diagrams. These diagrams, and others, are difficult for use in perceiving data correlations, patterns, and exceptions. Further, these diagrams, and the methods behind them, do not provide flexible display options.

BRIEF DESCRIPTION OF THE DRAWINGS

FIG. 5 is a graphical representation of a dataset according to an example embodiment.

DETAILED DESCRIPTION

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, such functions correspond to modules, which are software, hardware, firmware, or any combination thereof. Multiple functions are performed in one or more modules as desired, and the embodiments described are merely examples. The software is executed on a digital signal processor, application specific integrated circuit (ASIC), microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

The inventive subject matter provides a new visualization approach for multi-attribute, time-series hierarchical datasets. This approach is more flexible and more general than existing techniques. Provided are, among other things, visualization aids not only for viewing large datasets, but also for discovering correlations, patterns, and exceptions in a dataset. Thus, the inventive subject matter is useful in supporting visual data mining.

Some embodiments include partitioning an output area, such as a monitor screen or printer paper, depending on the tree structure of a multi-attribute, time-series hierarchical dataset and a user's demands. Because the user may want different layouts for different purposes, the inventive subject matter keeps the tree structure of the hierarchical dataset separate from the visual layout to provide endless possibilities for adapting the visual layout to meet the exact user needs.

Figure 1:
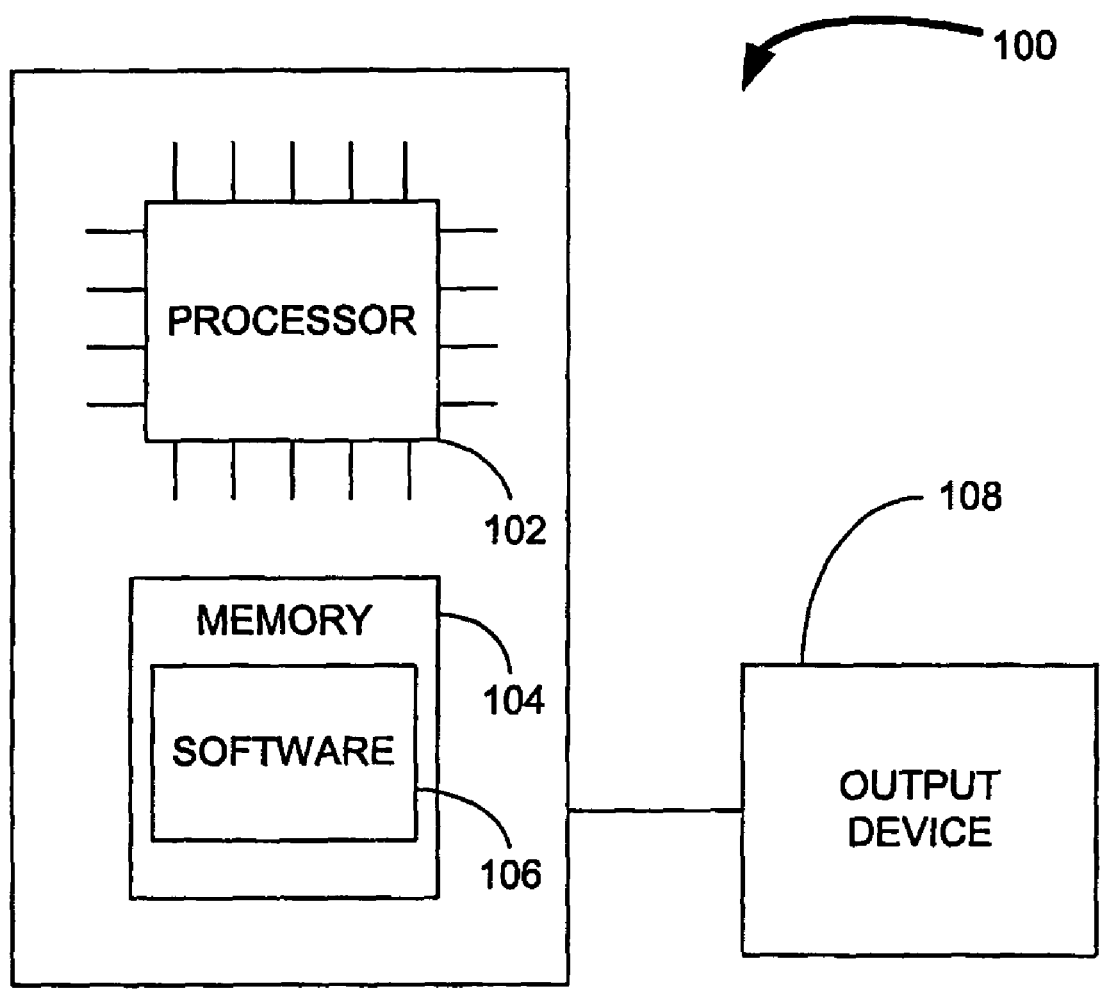
FIG. 1 is a schematic block diagram according to an example embodiment.

FIG. 1 is a schematic block diagram of a system 100 according to an example embodiment. The system 100 includes a processor 102, a memory 104, software 106, and an output device 108. In some embodiments, the system 100 also includes a network interface (not shown).

The system 100 is a computing device. The computing device, in various embodiments, includes a personal computer, a terminal computing device, a personal digital assistant, a mobile telephone with data communications capabilities, or other such devices including, or couplable to, an output device 108.

The processor 102 of the system 100 embodiment of FIG. 1 represents a digital signal processor or processing unit of any type of architecture, such as an ASIC (Application-Specific Integrated Circuit), a CISC (Complex Instruction Set Computing), RISC (Reduced Instruction Set Computing), VLIW (Very Long Instruction Word), or hybrid architecture, although any appropriate processor may be used. The processor 102 executes instructions. The processor 102 also includes a control unit that organizes data and program storage in memory, such as memory 104, and transfers data and other information in and out of the system 100 and, in some embodiments, to and from one or more network connections (not shown) over the optional network interface (not shown).

The memory 104 represents one or more mechanisms for storing data. For example, the memory 104, in various embodiments, includes one or more of a read only memory (ROM), random access memory (RAM), magnetic disk storage media, optical storage media, flash memory devices, and/or other volatile and non-volatile machine-readable media. In other embodiments, the memory includes any appropriate type of storage device or memory 104. Although only one memory 104 is shown, multiple memories 104 of various types and multiple types of storage devices can be present.

The output device 108 represents one or more mechanisms for outputting data. In some embodiments, the output device 108 is a monitor for visually displaying data. In other embodiments, the output device 108 is a printer. In further embodiments, the output device 108 is the network interface, over which data is communicated for use on another device.

In embodiments of the system 100 including a network interface, the network interface is couplable to a network. The network interface includes a device such as a wireless or wired Ethernet card, or other similar devices. The network, in various embodiments includes a local area network, a wide area network, an intranet, the Internet, or other network capable of carrying data to and from the system 100.

The software 106 stored in the memory 104 is operable on the processor 102 to cause the system to receive multi-attribute, time-series hierarchical datasets and to generate adaptable visualizations of the datasets allowing for fast comparison of data from different hierarchy levels. Visualizations generated by the software 106 further allow for quick identification of relationships, patterns, and trends within the dataset and animations of changes in the dataset over time. Stated differently, the software 106 generates a dashboard view for multi-attribute, time-series hierarchical datasets.

A multi-attribute, time-series hierarchical dataset used by the software 106 includes data collected over time and stored in any number of data structures. Some such data structures include one or more of relational database tables, flat files, a Resource Description Framework Schema (RDFS), or virtually any other type of data structure allowing for child data items that depend directly or indirectly from one or more parent data items. Some hierarchical dataset include data from disparate sources assembled using retrieval arguments or user parameters to define the hierarchy relationships therein.

The software 106 processes a dataset to generate geometric nodes for at least some data items within the dataset. The geometric nodes can be of any shape such as rectangles, triangles, circles, polygons, or any other shape. Nodes corresponding to different levels of the hierarchical dataset can be of different geometric shapes. Some embodiments further include nodes represented by graphics such as pictures.

The software 106 then arranges the nodes within an output area. Nodes for each level of the hierarchical dataset are represented and aligned within an output of the software 106. Child nodes are generated within their respective parent nodes.

Figure 2:
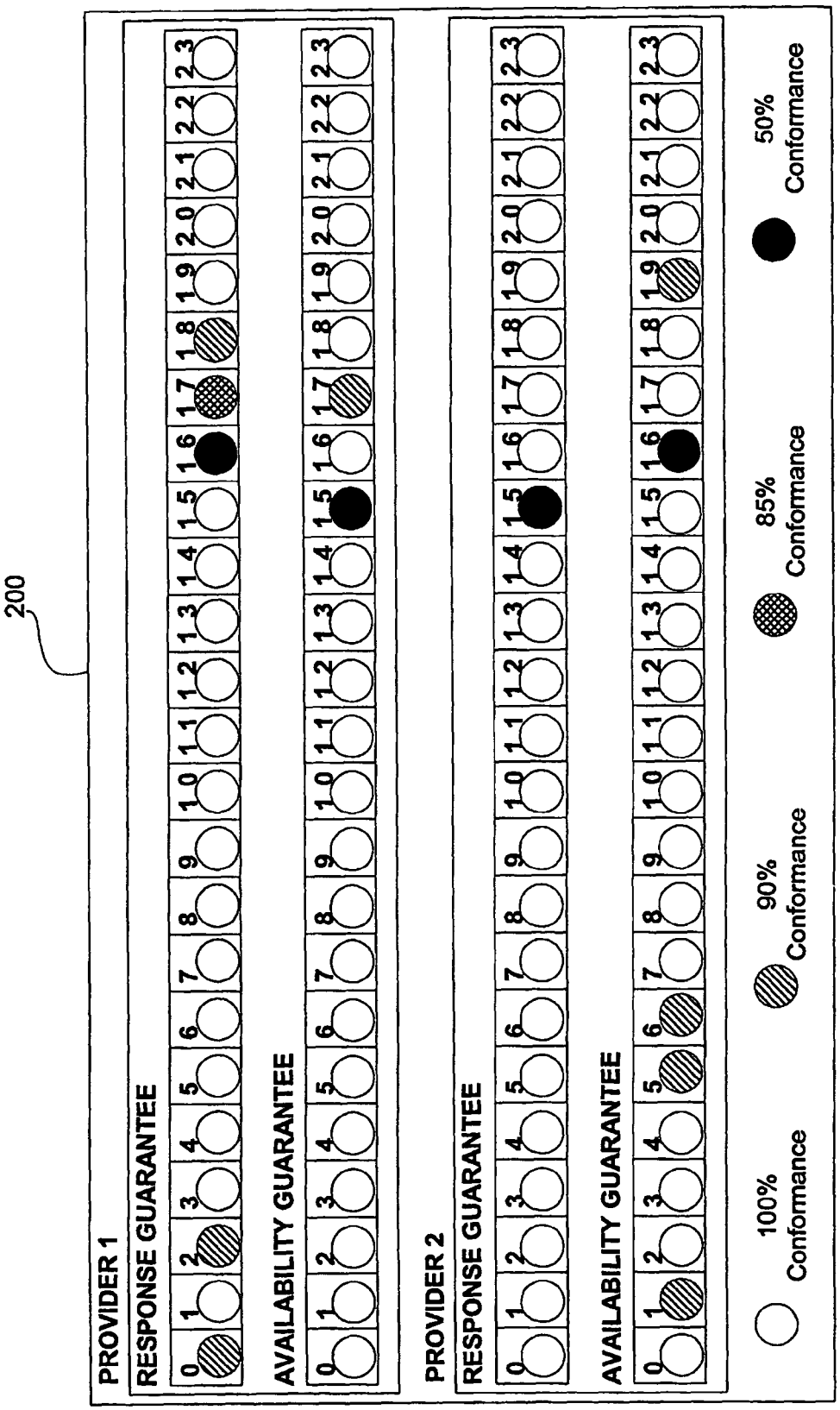
FIG. 2 is a graphical representation of a dataset according to an example embodiment.

FIG. 2 is a graphical representation 200 of a dataset according to an example embodiment. The graphical representation 200 is an example output from a system, such as an output from the software 106 of the system 100 shown in FIG. 1. The graphical representation 200 is of a four-level hierarchical dataset. The four-level hierarchical dataset is an example dataset representing service level conformance correlation between Provider 1 and Provider 2 in an Open View Internet Service Application (OVIS). The four levels of hierarchical data are as follows: 1) provider, 2) service level guarantees (i.e., Response Guarantee and Availability Guarantee), 3) time of day (i.e., hours 0-23), and 4) conformance percentage.

Within the graphical representation 200, the conformance percentage data for each hour within a day for each service level guarantee for each provider is similarly situated and aligned. This arrangement of data provides a dashboard view of the hierarchical data for quick correlation and identification of conformance patterns, trends, violations, anomalies, and other characteristics of the data.

Further note that other types of data can be represented similarly to the graphical representation 200 of FIG. 2. For example, school attendance data can be represented in such a four-level graphical representation. The levels in such an embodiment might be as follows: 1) school district, 2) school, 3) course, and 4) attendance percentage. There are many other uses for such a graphical representation and the systems and methods behind them as described herein. The example datasets and graphical representations shown and described herein are merely exemplary and are not intended to be limiting.

Figure 3:
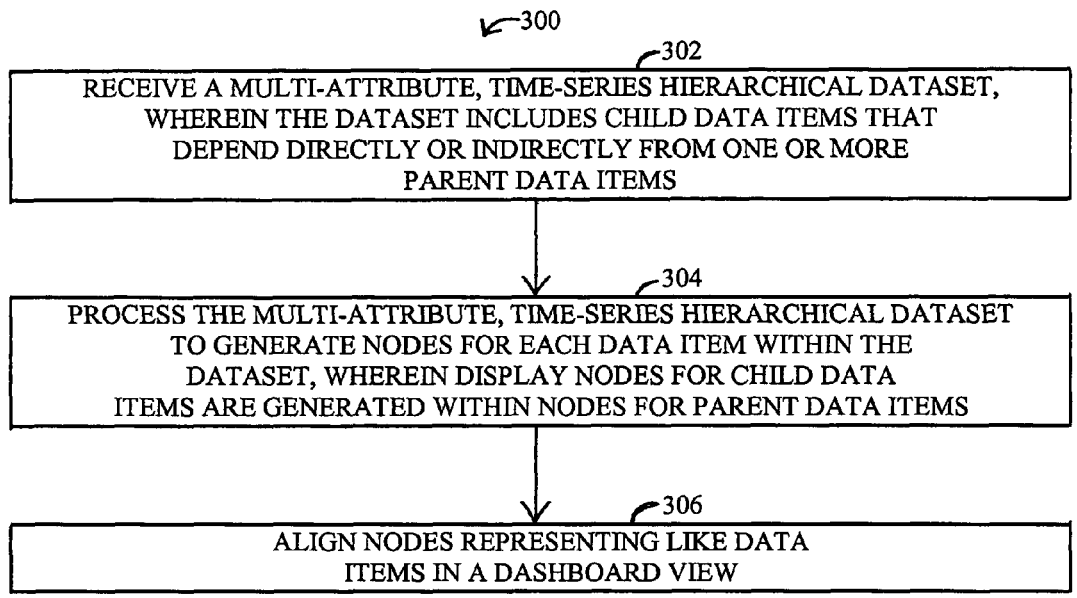
FIG. 3 is a flow diagram of a method according to an example embodiment.

FIG. 3 is a flow diagram of a method 300 according to an example embodiment. The method 300 provides one example method for generating a hierarchical dataset graphical representation, such as graphical representation 200 of FIG. 2. The method 300 includes receiving a multi-attribute, time-series hierarchical dataset, wherein the dataset includes child data items that depend directly or indirectly from one or more parent data items 302 and processing the hierarchical dataset to generate nodes for each data item within the hierarchical dataset, wherein nodes for child data items are generated within nodes for parent data items 304. The method 300 further includes aligning nodes representing like data items in a dashboard view 306.

In some embodiments, the method 300 further includes receiving user preferences and generating the parent and child display areas according to the user preferences. User preferences include instructions, such as retrieval arguments specifying data to request that is subsequently received. Some user preferences include instructions as to how data from disparate sources is to be arranged as a multi-attribute, time-series hierarchical dataset. Other user preferences include display preferences for displaying the data in the dashboard view. Display preferences, in various embodiments, include a starting level and a number of levels of a multi-attribute, time-series hierarchical dataset to display and data specifying shapes, pictures, and colors to use in displaying one or more levels of the hierarchical data.

Other display preferences include representation preferences. Representation preferences include types of representations used to represent various levels of the data. For example, the conformance percentage data level of graphical representation 200, as shown in FIG. 2, could alternatively be displayed as a bar chart, a line chart, or various other chart and graph types capable of representing the data of the conformance percentage data level. A further display preference includes a preference specifying a portion of an output area in which to display the graphical representation of the data. The portion of the output area can be less than the total output area or the entire output area. In some embodiments, the output area is the displayable area of a monitor. In other embodiments, the output area is one or more sheets of paper output from a printing device.

In some embodiments, the user preferences are received in two vectors. One such vector includes a vector specifying how the data in a received multi-attribute, time-series hierarchical dataset is to be arranged in a hierarchical fashion. The other vector specifies how the various levels of the multi-attribute, time-series hierarchical dataset are to be displayed.

Figure 4:
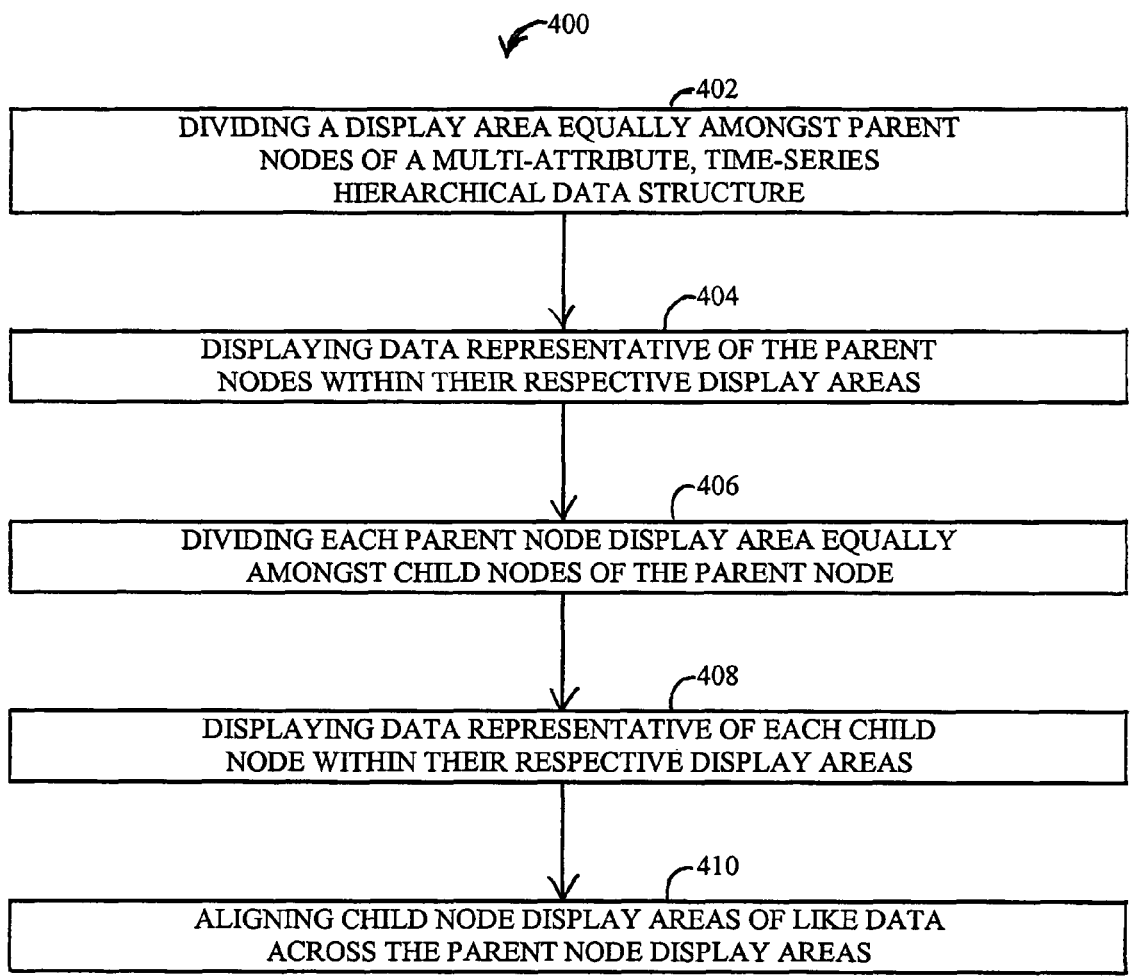
FIG. 4 is a flow diagram of a method according to an example embodiment.

FIG. 4 is a flow diagram of a method 400 according to an example embodiment. The method 400 includes dividing a display area equally amongst parent nodes of a multi-attribute, time-series hierarchical data structure 402 and displaying data representative of the parent nodes within their respective display areas 404. The method 400 further includes dividing each parent node display area equally amongst child nodes of the parent node 406, displaying data representative of each child node within their respective display areas 408, and aligning child node display areas of like data across the parent node display areas 410. In some such embodiments, a child node can also be a parent node of another child node. The data values of the various nodes of a graphical representation generated according to the method 400 can be represented by a color, a line on a graph relative to a value represented on an axis of the graph, or by a graphical representation representative of a value or value range.

In some embodiments, aligning child node display areas of like data across the parent node display areas 410 includes aligning child node display areas by time of day or date at which the data represented in the child node display areas was measured. In some such embodiments, the method further includes generating an animation of the data set over a period of time. This animation includes displaying measured values at intervals displayed in the graphical representation and changing the graphical representation to show a time-elapsed view of the measured values over time. Another embodiment includes regenerating the graphical representation upon passage of a period of time to show newly measured values. In some such embodiments, the period at which to regenerate the graphical representation is specified as a user preference.

The method 400, in some embodiments, further includes providing the ability to drill down within a dataset to obtain a more detailed visualization of the data. This includes receiving a selection of a child node and obtaining child data of the selected child node. The method further includes dividing the selected child node display area amongst the obtained child data and displaying a representation of the obtained child data within the display area of the selected child node. In these embodiments, the data of the selected child node is parent data to the obtained child data.

Figure 5:
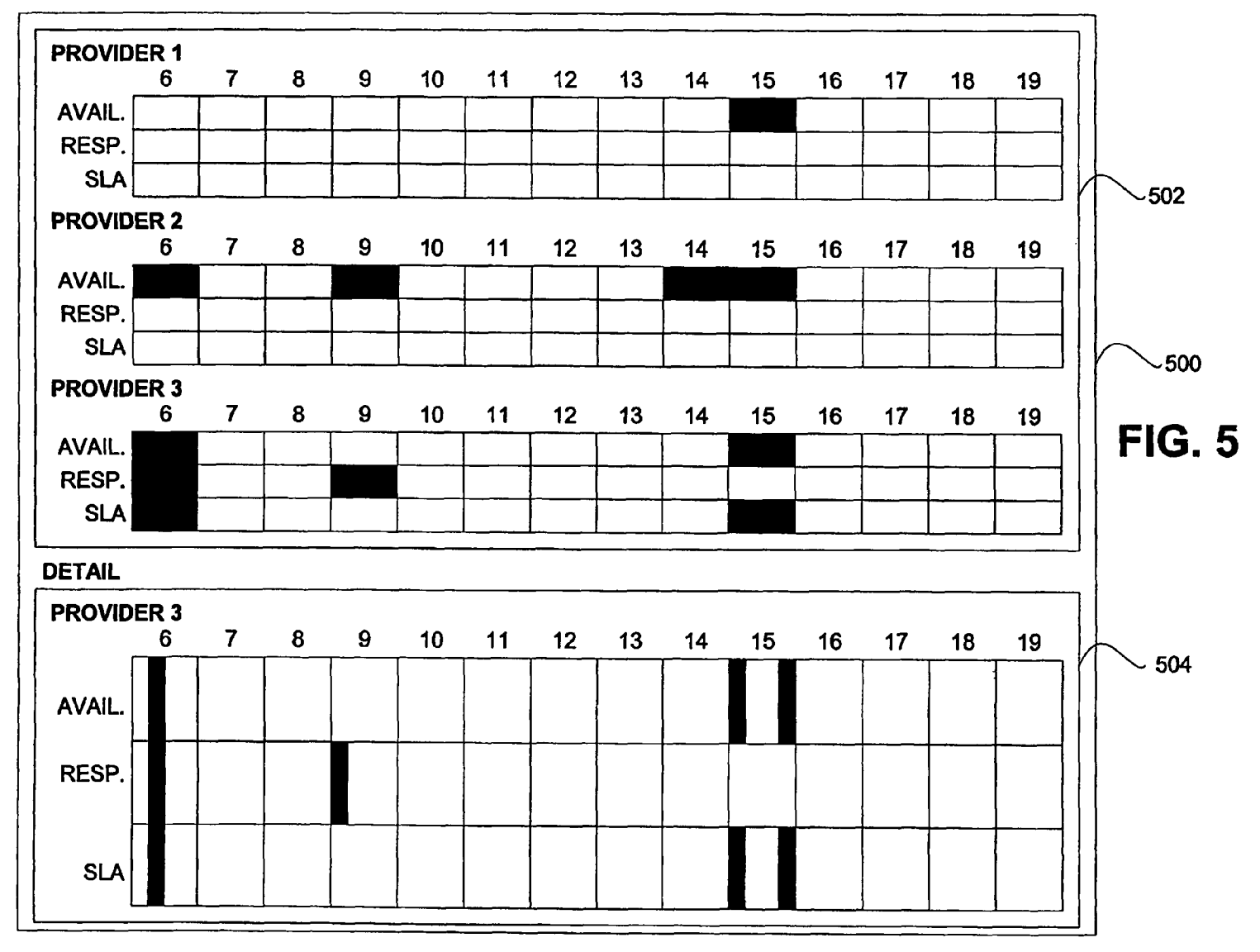

FIG. 5 is a graphical representation 500 of a multi-attribute, time-series hierarchical dataset according to an example embodiment. The graphical representation 500 is a dashboard view of a four-level hierarchical dataset showing, in the first portion 502 of the graphical representation 500, conformance with service level objectives (i.e., AVAIL. and RESP.) and a service level agreement (i.e., SLA) including those service level objectives for three providers. This conformance data is displayed at a granularity of one hour intervals with a black rectangle indicating a violation at the time indicated at the top of the column of the objective or agreement violated at the left of the row. The second portion 504 of the graphical representation shows a violations at a granularity of fifteen minute intervals. As illustrated, the second portion 504 is displaying a more detailed representation of the data for Provider 3.

The data displayed in the second portion 504 is selected by a user by interacting with the graphical representation 500 when displayed on a monitor of a system. Clicking with a mouse, or otherwise selecting, an area of the first area 502 causes more detailed data to be displayed in the second area. Some such embodiments allow a user to drill down further into the hierarchical dataset of the graphical representation to gain more detail within the data. In some such embodiments, the more detailed data is displayed in the second portion 504. In other embodiments, the more detailed data is displayed in the first portion 502 upon receipt of command from a user. When such a command is received to display more detailed data in the first portion 502, more detailed data is displayed for all parent nodes within the first portion 502.

Figure 6:
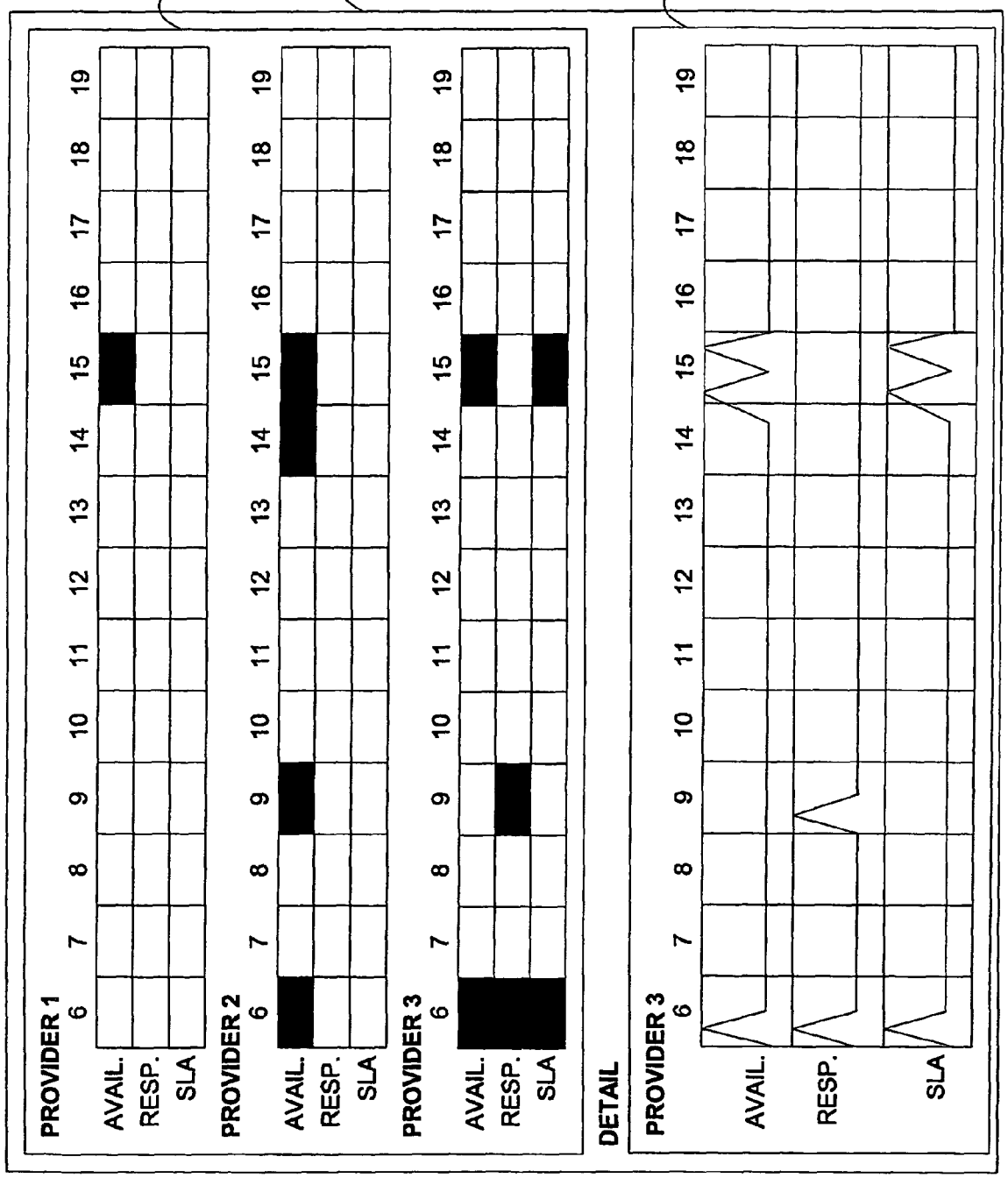
FIG. 6 is a graphical representation of a dataset according to an example embodiment.

FIG. 6 is a graphical representation 600 of a dataset according to an example embodiment. This graphical representation 600 is a dashboard view of the same multi-attribute, time-series hierarchical dataset of the graphical representation 500 of FIG. 5. The first portion 602 is identical to the first portion 502 of FIG. 5. However, second portion 604 includes a line graph for displaying the more detailed data for provider 3. This illustrates one form of flexibility provided to users. Alternatively, the second portion 604 can be exclusively displayed in another graphical representation including only the second portion. In such an embodiment, a user can select a data item to detail in the second portion 602 for display in another graphical representation.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of this inventive subject matter may be made without departing from the principles and scope of the inventive subject matter as expressed in the subjoined claims.

We claim:

1. A method executed by a computer, comprising:
receiving a multi-attribute, time-series hierarchical dataset, wherein the dataset includes child data items that depend directly or indirectly from one or more parent data items, and the dataset further includes sub-child data items that depend from the child data items;
processing, by the computer, the multi-attribute, time-series hierarchical dataset to generate geometric nodes for each data item within the dataset, wherein the geometric nodes for the child data items are generated within the geometric nodes for parent data items, and wherein the geometric nodes for the sub-child data items are generated within the geometric nodes for the child data items, wherein processing the multi-attribute, time-series hierarchical dataset comprises:
dividing a first display area among the geometric nodes for the parent data items;
dividing a display area of each of the geometric nodes for the parent data items among the geometric nodes for the child data items; and
dividing a display area of each of the geometric nodes for the child data items among the geometric nodes for the sub-child data items; and
aligning corresponding ones of the geometric nodes representing like data items in a dashboard view, wherein the geometric nodes for the parent data items are displayed in the dashboard view, and wherein the display area of each of the geometric nodes for the parent data items includes geometric nodes for the respective child data items, and the display area of each of the geometric nodes for the child data items includes geometric nodes for the respective sub-child data items.

2. The method of claim 1, further comprising:
receiving user preferences; and
generating the display areas corresponding to the geometric nodes for the parent data items, the geometric nodes for the child data items, and the geometric nodes for the sub-child data items according to the user preferences.

3. The method of claim 2, wherein the user preferences comprise data representative of a parent node from which to begin and end processing of the dataset.

4. The method of claim 2, wherein the user preferences comprise data representing a window of data to process and display at a lowest child level.

5. The method of claim 4, wherein the data representing the window of data to process and display at the lowest child level is a window of time in which the data was measured and a granularity at which to display the data.

6. The method of claim 1, wherein geometric node appearance represents a value of the underlying data.

7. The method of claim 1, wherein aligning the corresponding ones of the geometric nodes representing like data items comprises aligning the corresponding ones of the geometric nodes according to a time when the like data items were measured.

8. A method executed by a computer comprising:
dividing a display area equally amongst parent nodes of a multi-attribute, time-series hierarchical data structure to form respective parent node display areas;
displaying data representative of the parent nodes within the respective parent node display areas;
dividing, by the computer, each parent node display area equally amongst child nodes of the parent node to form respective child node display areas;
displaying data representative of the child nodes within the respective child node display areas; and
aligning child node display areas of like data across the parent node display areas;
dividing, by the computer, each child node display area equally amongst sub-child nodes of the child node to form respective sub-child node display areas; and
displaying data representative of the sub-child nodes within the respective sub-child node display areas.

9. The method of claim 8, wherein a data value of a lowest level child node is represented by a corresponding color.

10. The method of claim 8, further comprising:
receiving a time window over which to animate data in the time window; and
animating the data over the period of the received time window.

11. The method of claim 8, further comprising:
receiving a selection of one of the child nodes; and
obtaining child data of the selected child node;
dividing the selected child node display area amongst the obtained child data; and
displaying a representation of the obtained child data within the display area of the selected child node.

12. A computer storage media having instructions stored thereon for causing a computer to perform the method of:
receiving a multi-attribute, time-series hierarchical dataset, wherein the dataset includes child data items that depend directly or indirectly from one or more parent data items, and the dataset further includes sub-child data items that depend from the child data items;
processing the dataset to generate geometric nodes for at least some data items within the dataset, wherein the geometric nodes for the child data items are generated within the geometric nodes for the parent data items, and wherein the geometric nodes for the sub-child data items are generated within the geometric nodes for the child data items, wherein processing the dataset comprises:
dividing a first display area among the geometric nodes for the parent data items; dividing a display area of each of the geometric nodes for the parent data items among the geometric nodes for the child data items; and
dividing a display area of each of the geometric nodes for the child data items among the geometric nodes for the sub-child data items; and
aligning corresponding ones of the geometric nodes representing like data items on a display, wherein the geometric nodes for the parent data items are displayed in the display, and wherein the display area of each of the geometric nodes for the parent data items includes geometric nodes for the respective child data items, and the display area of each of the geometric nodes for the child data items includes geometric nodes for the respective sub-child data items.

13. The computer storage media of claim 12, wherein each geometric node for a corresponding one of the child data items includes a graphical representation selected from a group of one or more graphic items representative of data values.

14. A system comprising:
a processor;
a memory;
an output device;
software stored in the memory and operable on the processor to generate a signal to the output device by causing the system to:
divide an output area equally amongst parent nodes of a multi-attribute, time-series hierarchical data structure;
divide each parent node output area equally amongst child nodes of the parent node;
arrange data representative of the parent and child nodes within their respective display areas;
align child node display areas of like data across the parent node display areas;
divide the display area of each of the child nodes equally amongst sub-child nodes of the child node to form respective sub-child node display areas; and
arrange data representative of the sub-child nodes within the respective sub-child node display areas.

15. The system of claim 14, wherein the output device is a monitor.

16. The system of claim 14, wherein the software aligns the child node output areas by time at which the data represented by the child nodes was measured.

17. The system of claim 16, wherein the data represented in an output signal generated by the software is data representative of conformance with one or more service level objectives of one or more service level agreements with one or more entities.

18. The system of claim 14, wherein the software is further operable on the processor to generate an animated view of the multi-attribute, time-series hierarchical data structure.

19. The system of claim 18, wherein the animated view of the multi-attribute, time-series hierarchical data structure shows changes in child node data values over time.

20. The method of claim 1, further comprising aligning the geometric nodes for the sub-child data items in the display area of the geometric node for one parent data item with geometric nodes for the sub-child data items in the display area of the geometric node for another parent data item.

21. The method of claim 1, wherein the geometric nodes for the child data items display data for the child data items at a first time granularity, the method further comprising:
displaying another portion in the dashboard view, the another portion containing graphical representations of data for at least one of the child data items at second, finer time granularity.

22. The method of claim 8, wherein the hierarchical data structure includes data representative of measured conformance with one or more contractual specifications.

23. The method of claim 8, further comprising aligning sub-child node display areas of like data across the child node display areas according to time when corresponding data was measured.

24. The method of claim 8, wherein displaying the data representative of the parent nodes, displaying the data representative of the child nodes, and displaying the data representative of the sub-child nodes are performed concurrently by a display device.

25. The method of claim 1, further comprising displaying the geometric nodes of the parent data items, the geometric nodes of the child data items, and the geometric nodes of the sub-child data items concurrently on a display device.

26. The computer storage media of claim 12, wherein the instructions are further to cause the computer to cause display of the geometric nodes for the parent data items, the geometric nodes for the child data items, and the geometric nodes for the sub-child data items concurrently on a display device.

27. The system of claim 14, wherein the software is further operable on the processor to further cause display of the data representative of the parent nodes, display of the data representative of the child nodes, and display of the data representative of the sub-child nodes concurrently by the output device.

* * * * *

UNITED STATES PATENT AND TRADEMARK OFFICE
CERTIFICATE OF CORRECTION

| | | |
|---|---|---|
| PATENT NO. | : 7,827,499 B2 | Page 1 of 1 |
| APPLICATION NO. | : 10/977463 | |
| DATED | : November 2, 2010 | |
| INVENTOR(S) | : Ming C. Hao et al. | |

It is certified that error appears in the above-identified patent and that said Letters Patent is hereby corrected as shown below:

In column 7, line 65, in Claim 12, after "display," delete "and".

Signed and Sealed this
Eighth Day of March, 2011

David J. Kappos
*Director of the United States Patent and Trademark Office*